May 3, 1927.

M. W. HAZLETT

RETRACTING CASTER

Filed Nov. 22, 1926

Inventor
Merritt W. Hazlett
By Adam E. Fisher
His Attorney

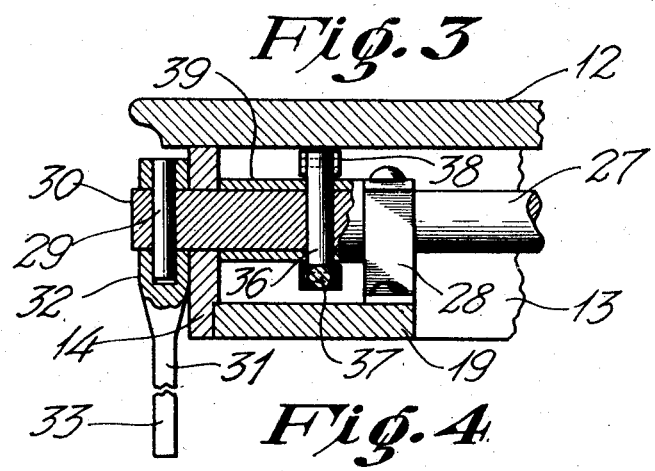
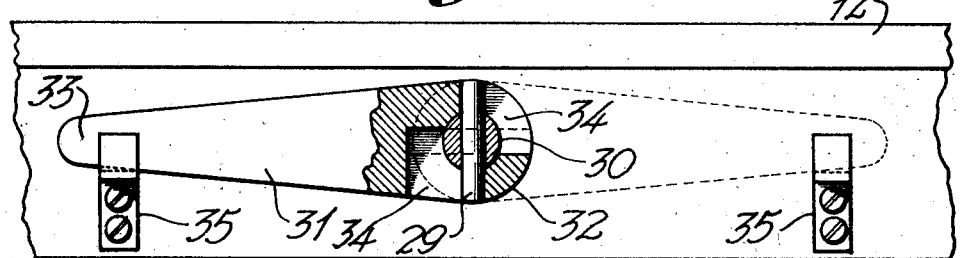
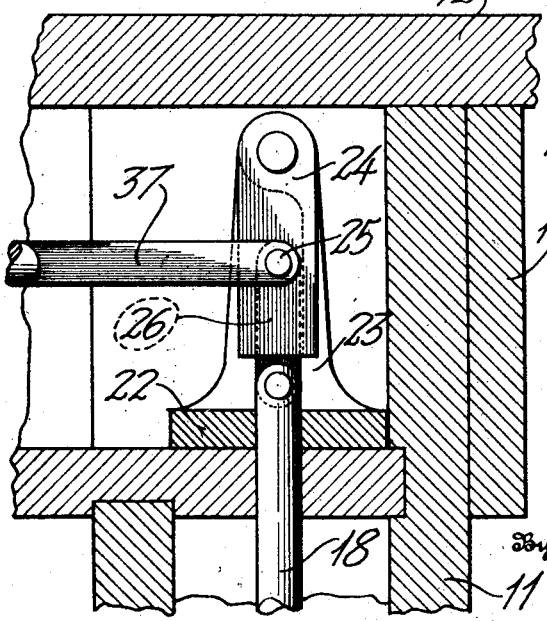
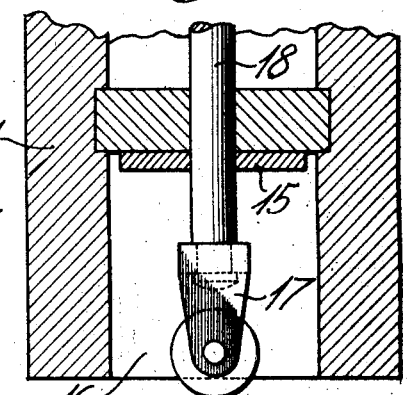

Patented May 3, 1927.

1,626,819

UNITED STATES PATENT OFFICE.

MERRITT W. HAZLETT, OF FRANKLIN, NEW YORK.

RETRACTING CASTER.

Application filed November 22, 1926. Serial No. 149,901.

My invention relates to retracting casters, and more particularly to that class of retracting casters adapted to be used in stands or tables of the kind in which the legs of the stand are equipped with rollers or casters that are adapted to be moved relatively to the legs into and out of engagement with the floor so as to facilitate the movement of the stand from one place to another.

One object of my invention is to provide a device of the kind described that is so constructed that the stand will be perfectly rigid when the rollers or casters on the legs are arranged in their elevated or retracted position, whereby the said casters will be rendered inoperative and the legs of the stand thereby permitted to rest entirely on the floor.

Another object of my invention is to provide a stand of the type referred to that can be manufactured at low cost and which is equipped with a raising and lowering mechanism that will be rugged and strong, simple and easy to operate, and readily locked in either the operative or inoperative (retracted) position.

With the above and other objects in view, my invention consists of the combination and arrangements of parts hereinafter described and claimed, it being understood that, within the scope of what is claimed, changes may be made in the precise embodiment shown without departing from the spirit of the invention.

In the drawings:

Figure 3 is a part sectional view of the stand showing the operating handle and one of the bracket bearings.

Figure 4 is a part elevation of the end of the stand showing a partly sectional view of the operating handle and the stops in connection therewith.

Figure 5 is an enlarged view of the upper end of one of the legs of the stand with the caster in the operative position, showing the mechanism in connection therewith.

Figure 6 is a detail of the lower end of one of the legs of the stand showing the method of mounting the caster.

Figure 1:
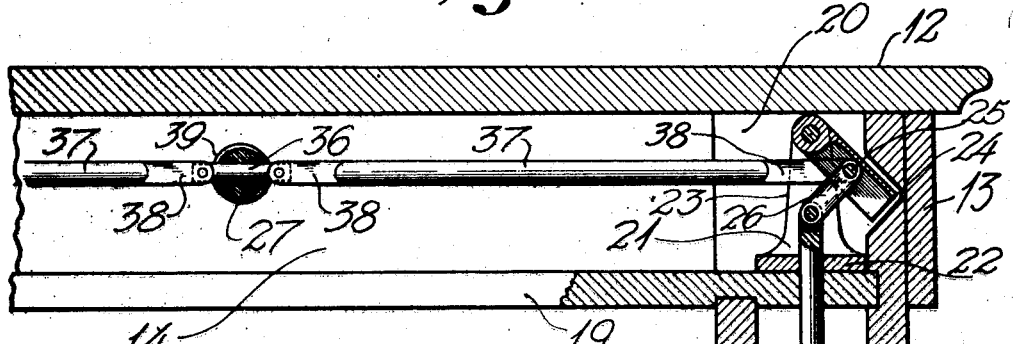
Figure 1 is a sectional view of part of the stand and one of the legs thereof, showing my invention in connection therewith.
Figure 2:
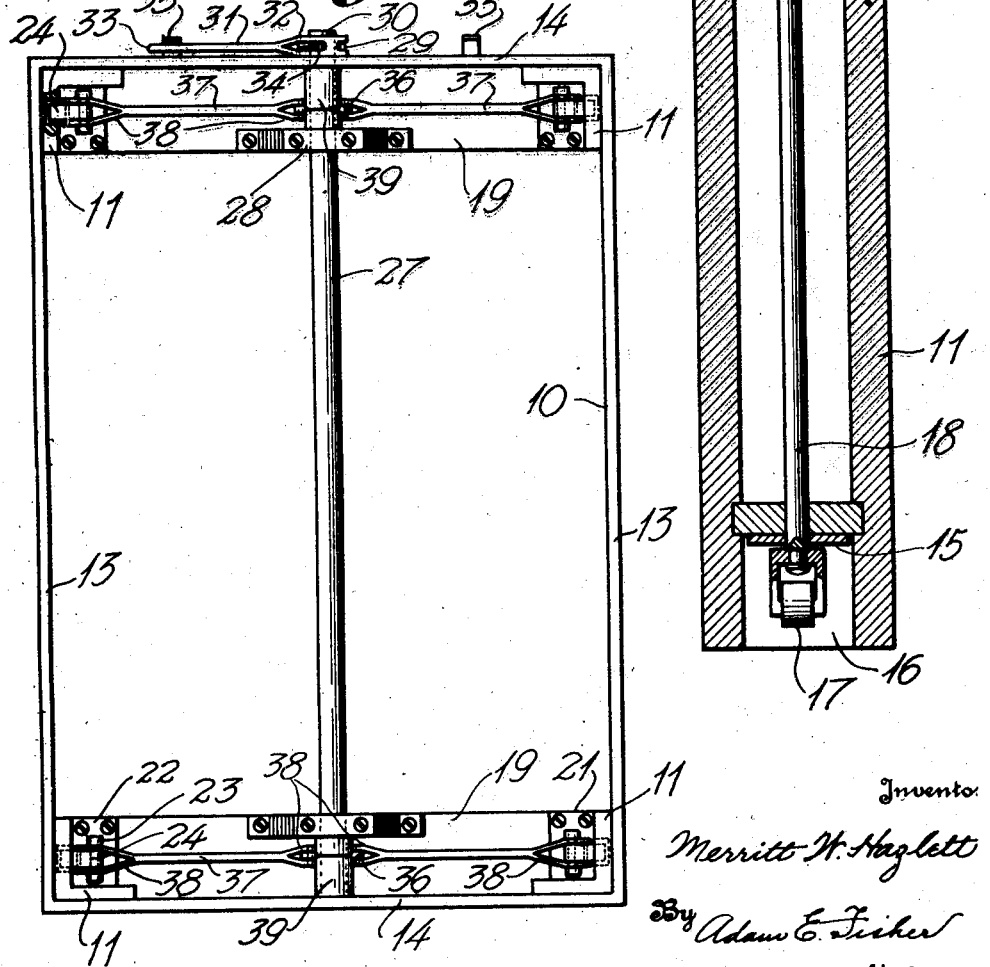
Figure 2 is a plan view of a stand with the top thereof removed showing my invention in connection therewith.

Referring now more particularly to the drawings, my invention is adapted to be used in connection with any kind of a stand, but in the drawings the invention is shown in use in connection with a table 10, having four legs 11, top 12, side rails 13 and end rails 14, as is usual in such constructions. In the embodiment shown, the legs 11 are shown constructed hollow, but if solid legs are used it is obvious that suitable passages may be provided in the said legs to serve the required purpose. A guide plate 15 is positioned interiorly the lower end of the said leg 11, and spaced a required distance from the lower end of the leg suitably to provide a recess as at 16 for the accommodation of the caster 17 revolvably positioned at the lower end of the vertical caster support rod 18, the said rod 18 being slidably journaled in the said guide plate 15, whereby the said caster 17 is adapted to be retracted into the said recess 16 as will hereinafter be described. A transverse piece 19 extends across the end of the table and over the upper ends of the legs 11, suitably to provide over each leg a recess as at 20 between the said transverse piece 19 and the underside of the table top 12. A bracket 21 is positioned in the said recess 20 and the said support rod 18 is slidably journaled in the base 22 of the said bracket 21. The said bracket 21 carries the upstanding bearings 23, having the downwardly projecting U-shaped toggle link 24 pivotally mounted therein; a transverse pin 25 is mounted medially the said toggle link 24, and a connecting link 26 pivotally connects the said toggle link 24 with the upper end of the support rod 18; the said connecting link 26 is adapted to be enveloped by and restrained from further movement by the U-shaped portion of the said toggle link 24 when the said toggle link 24 and the connecting link 26 are slightly past vertical alignment with each other, at which time the said support rod 18 is caused to move downwardly so that the caster 17 is projected below the lower end of the leg 11 whereby the said caster 17 is adapted to support the weight of the table by means of the support rod 18, connecting link 26, toggle link 24, bracket 21 and transverse piece 19; it is obvious that the vertical alignment of the toggle link 24 and connecting link 26 forms a self locking toggle mechanism and is adapted to transmit the weight of the table directly to the caster 17 without placing any strain upon the operating mechanism now to be described.

A horizontal shaft 27 is journaled longitudinally the center line of the table 10 in the bracket bearings 28 mounted on the said transverse pieces 19. One end 30 of the said shaft 27 is passed through the corresponding end rail 14; a pin 29 is positioned through the said end 30 of the shaft, and an operating handle 31 is mounted on the said shaft over the said pin; the said operating handle comprises a hub portion 32 and a handle portion 33; arcuate recesses 34 are provided on opposite sides of the hub portion 33 and adapted to receive the ends of the said pin 29 therein; the said recesses extend through an angle of 90 degress, and the end walls of the recesses form shoulders or stops adapted to engage the said pin, whereby the said handle is adapted to rotate through an angle of 180 degrees while causing the shaft 27 to rotate through an angle of 90 degrees only as shown by dotted lines in Figure 4; in this manner it is provided that the operating handle 31 will be in a horizontal position when the caster is either in the operative or inoperative positions. Stops 35 are positioned on the end rail 14 on either side of the said shaft 27 suitably to engage the said operating handle 31 when in its extreme positions.

Between the bearing brackets 28 and the end rails 14 of the table, the shaft 27 has positioned therethrough a pin 36, one of the said pins 36 being provided for each pair of legs of the table; two such pins are provided in the embodiment shown, one at each end of the table. Pivotally connecting the outer end of the said pin 36 to the pin 25 before described as mounted on the toggle link 24 is the connecting rod 37 provided with bifurcated ends as at 38 for this purpose. Opposite ends of the pins 36 are connected to the mechanisms in opposite legs, whereby the rotation of the shaft 27 will simultaneously cause the action of the before described toggle link 24 and connecting link 26. It is obvious that the aforesaid pin 36 acts as a double ended crank to operate the toggle joints as described. A sleeve 39 is positioned over the shaft 27 and between the bracket bearing 28 and the end rail 14; the said sleeve has the said pin 36 passed therethrough, and acts as a stop to prevent the longitudinal movement of the said shaft 27.

I claim:

1. A table, supporting legs therefor, caster supports mounted for vertical movement in each of the legs; actuating mechanism for moving the supports vertically in the legs and including a self locking toggle joint pivotably mounted on the upper end of the said supports; and means for releasably bringing the said self locking toggle joint into its locking position.

2. A table, supporting legs therefor, caster supports mounted for vertical movement in each of the legs; actuating mechanism for moving the supports vertically in the legs and including a self locking toggle joint pivotably mounted on the upper end of the said supports; a shaft longitudinally journaled in the said table; cranks positioned on the said shaft; connecting rods pivotally mounted on the cranks and the said toggle mechanism; and means for rotating the said shaft.

In testimony whereof I affix my signature.

MERRITT W. HAZLETT.